(12) United States Patent
Yamaguchi et al.

(10) Patent No.: US 7,388,716 B2
(45) Date of Patent: Jun. 17, 2008

(54) VARIABLE MAGNIFICATION OPTICAL SYSTEM AND IMAGING DEVICE

(75) Inventors: Shinji Yamaguchi, Osaka (JP); Tetsuo Kohno, Suita (JP); Genta Yagyu, Nishinomiya (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 60 days.

(21) Appl. No.: 11/604,447

(22) Filed: Nov. 27, 2006

(65) Prior Publication Data
US 2007/0121218 A1 May 31, 2007

(30) Foreign Application Priority Data
Nov. 29, 2005 (JP) ............................. 2005-343079

(51) Int. Cl.
*G02B 15/14* (2006.01)
(52) U.S. Cl. .................................... 359/689; 359/686
(58) Field of Classification Search ................ 359/686, 359/689
See application file for complete search history.

(56) References Cited

U.S. PATENT DOCUMENTS

| | | | | |
|---|---|---|---|---|
| 5,111,338 A | * | 5/1992 | Nakayama | 359/686 |
| 6,943,962 B2 | | 9/2005 | Sekita | 359/689 |
| 6,978,088 B2 | | 12/2005 | Nomura | 396/73 |
| 7,046,452 B2 | | 5/2006 | Ori | 359/689 |

* cited by examiner

*Primary Examiner*—William C Choi
(74) *Attorney, Agent, or Firm*—Sidley Austin LLP

(57) ABSTRACT

A variable magnification optical system for forming an optical image of an object onto a light acceptance surface of an image sensor, has in order from an object side: a first lens group having negative optical power; a second lens group having positive optical power; and a third lens group having positive optical power, the third lens group including at least two lenses. In magnification change from a wide-angle limit to a telephoto limit, the first lens group moves along a locus convex to an image side, the second lens group moves monotonically to the object side, and the third lens group moves along a locus convex to the object side.

19 Claims, 9 Drawing Sheets

FIG.5A FNO=3.60   FIG.5B Y'=3.5   FIG.5C Y'=3.5

(W)

SPHERICAL ABERATION
SINE CONDITION

ASTIGMATISM

DISTORTION %

FIG.5D FNO=4.20   FIG.5E Y'=3.5   FIG.5F Y'=3.5

(M)

SPHERICAL ABERATION
SINE CONDITION

ASTIGMATISM

DISTORTION %

FIG.5G FNO=5.10   FIG.5H Y'=3.5   FIG.5I Y'=3.5

(T)

SPHERICAL ABERATION
SINE CONDITION

ASTIGMATISM

DISTORTION %

FIG. 6A FNO=3.60  FIG. 6B Y'=3.5  FIG. 6C Y'=3.5

(W)

SPHERICAL ABERATION SINE CONDITION  ASTIGMATISM  DISTORTION %

FIG. 6D FNO=4.20  FIG. 6E Y'=3.5  FIG. 6F Y'=3.5

(M)

SPHERICAL ABERATION SINE CONDITION  ASTIGMATISM  DISTORTION %

FIG. 6G FNO=5.10  FIG. 6H Y'=3.5  FIG. 6I Y'=3.5

(T)

SPHERICAL ABERATION SINE CONDITION  ASTIGMATISM  DISTORTION %

FIG.7A FNO=3.60 FIG.7B Y'=3.5 FIG.7C Y'=3.5

(W)

—— d
----- SC

----- DM
—— DS

-0.1  0.1
SPHERICAL ABERATION
SINE CONDITION

-0.1  0.1
ASTIGMATISM

-10.0  10.0
DISTORTION %

FIG.7D FNO=4.20 FIG.7E Y'=3.5 FIG.7F Y'=3.5

(M)

—— d
----- SC

----- DM
—— DS

-0.1  0.1
SPHERICAL ABERATION
SINE CONDITION

-0.1  0.1
ASTIGMATISM

-10.0  10.0
DISTORTION %

FIG.7G FNO=5.10 FIG.7H Y'=3.5 FIG.7I Y'=3.5

(T)

—— d
----- SC

----- DM
—— DS

-0.1  0.1
SPHERICAL ABERATION
SINE CONDITION

-0.1  0.1
ASTIGMATISM

-10.0  10.0
DISTORTION %

FIG.9

VARIABLE MAGNIFICATION OPTICAL SYSTEM AND IMAGING DEVICE

This application is based on the application No. 2005-343079 filed in Japan Nov. 29, 2005, the entire content of which is hereby incorporated by reference.

BACKGROUND OF THE INVENTION

1. Field of the Invention

The present invention relates to a variable magnification optical system and, for example, to a variable magnification optical system suitable for a digital camera, a video camera, a digital device with image input function, and the like capable of acquiring an image of a photographic object through an image sensor. In particular, the present invention relates to a small zoom lens system suitable for a barrel retraction type. The present invention further relates to an imaging device employing a variable magnification optical system.

2. Description of the Related Art

In recent years, size reduction is progressing in digital cameras and video cameras. Thus, size reduction and thickness reduction are desired in imaging devices employed in these cameras. Further, demand is also increasing for compact imaging devices capable of being installed on digital devices such as a portable phone and a personal information terminal. Thus, in the prior art, various types of zoom lens systems have been proposed in order to satisfy such desire. For example, in zoom lens systems described in Patent Documents 1 and 2, the number of lenses and the thickness of each lens group are reduced so that the thickness is reduced at the time of barrel retraction. As a result, the camera size is reduced at the time of lens accommodation. In zoom lens system described in Patent Document 3, one of lens groups escapes from the optical axis at the time of barrel retraction so that the thickness reduction is achieved in the camera.

[Patent Document 1] U.S. Pat. No. 6,943,962B2
[Patent Document 2] U.S. Pat. No. 7,046,452B2
[Patent Document 3] U.S. Pat. No. 6,978,088B2

In the zoom lens systems proposed in Patent Documents 1 and 2, although the camera thickness is suppressed at the time of lens accommodation, the overall lens length in the image shooting state becomes long. This causes complexity in the mechanical configuration for moving the most object side lens group to the image shooting state position. In the zoom lens system proposed in Patent Document 3, the lens barrel thickness at the time of barrel retraction is reduced further by virtue of the employed escape technique. This causes further difficulty in the draw-out of the lens at the time of image shooting.

The present invention has been devised in view of such situations. An object of the present invention is to provide: a variable magnification optical system in which reduction of the thickness in a retracted state and reduction of the overall lens length in the image shooting state are achieved with maintaining satisfactory optical performance; and an imaging device employing this variable magnification optical system.

SUMMARY OF THE INVENTION

In order to achieve the above-mentioned object, the variable magnification optical system according to a first invention is characterized by a variable magnification optical system for forming with variable magnification an optical image of an object onto a light acceptance surface of an image sensor, comprising in order from the object side: a first lens group having negative optical power; a second lens group having positive optical power; and a third lens group having positive optical power, the third lens group including at least two lenses, wherein in magnification change from the wide-angle limit to the telephoto limit, the first lens group moves along a locus convex to the image side, the second lens group moves monotonically to the object side, and the third lens group moves along a locus convex to the object side.

The imaging device according to a second invention is characterized by employing the variable magnification optical system according to the first invention described above.

BRIEF DESCRIPTION OF THE DRAWINGS

These and other objects, advantages and features of the invention will become apparent from the following description thereof taken in conjunction with the preferred embodiments with the reference to the accompanying drawings in which.

DETAILED DESCRIPTION OF THE PREFERRED EMBODIMENT

A variable magnification optical system, an imaging device, and the like according to the present invention are described below with reference to the drawings. The imaging device according to the present invention is an optical apparatus for optically acquiring an image of a photographic object and then outputting the image as an electric signal. This imaging device serves as a main component of a camera used for static image shooting or video image shooting of a photographic object. Such cameras include a digital camera, a video camera, a surveillance camera, a car-installed camera, a camera for TV phone, and a camera for door phone. Other examples are cameras built in or externally attached to a personal computer, a portable information device (a small and portable information device or terminal such as a mobile computer, a portable phone, and a personal information terminal (PDA: Personal Digital Assistant)), a peripheral device thereof (such as a mouse, a scanner, a printer, and a memory), and another digital device. As seen from these examples, a camera can be constructed using the imaging device. Further, when the imaging device is installed in devices of various kinds, a camera function is added. For example, a digital device with image input function such as a camera-equipped portable phone may be constructed.

Here, conveniently, the word 'digital camera' has indicated mainly a camera for recording an optical still image. However, digital still cameras and home digital movie cameras have also been proposed that can process a still image and a video image simultaneously. Thus, such distinction is presently not essential. Thus, the word 'digital camera' herein indicates each camera of all types that has as a main component an imaging device comprising: a shooting lens system for forming an optical image; and an image sensor for converting the optical image into an electric image signal. Examples of such cameras include a digital still camera, a digital movie camera, and a web camera (regardless of open type or private type, a camera connected to a device that is connected to a network and thereby permits transmission and reception of an image; such a camera may directly be connected to the network or alternatively may be connected via a device such as a personal computer having an information processing function).

Figure 1:
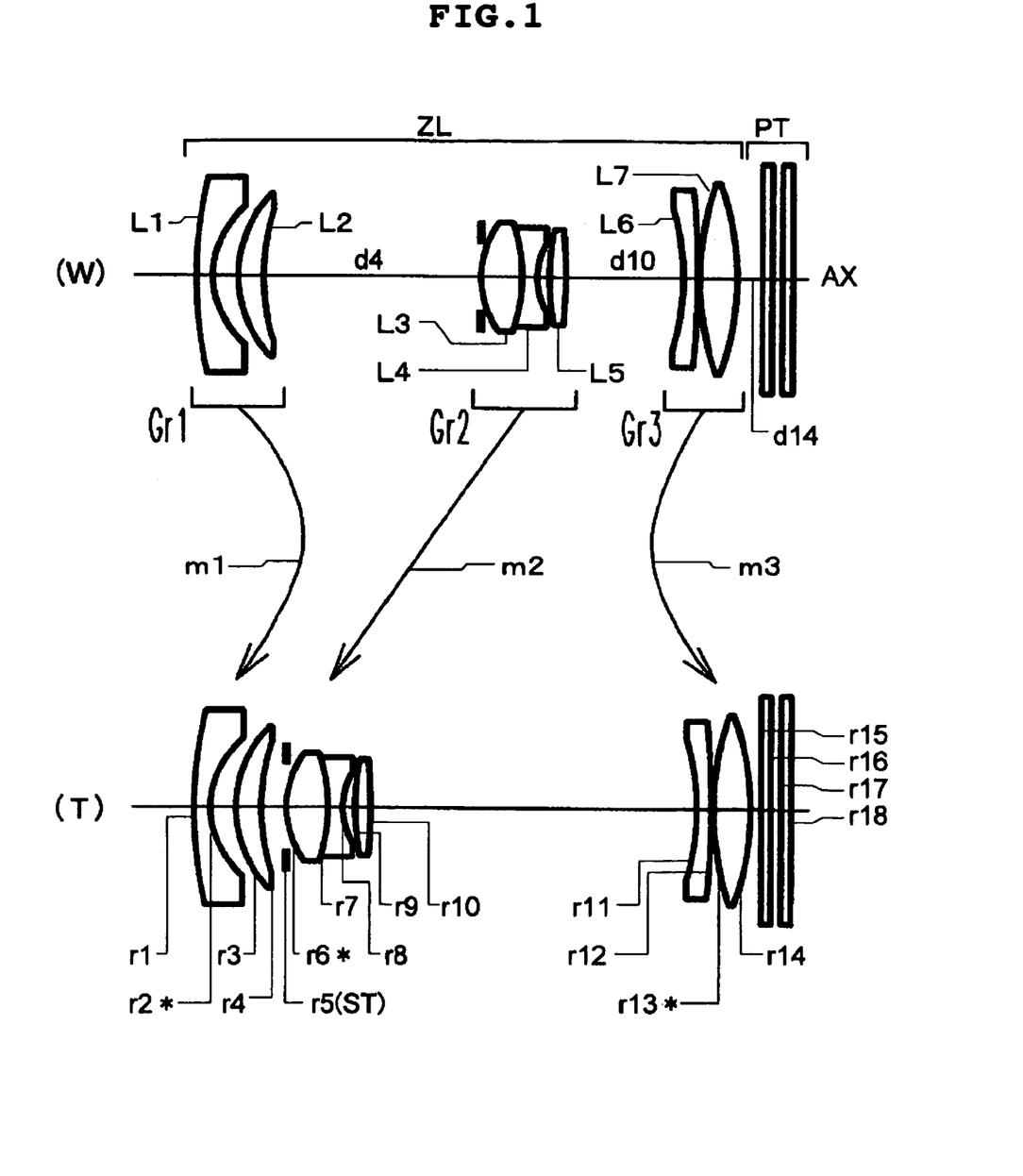
FIG. 1 is a lens configuration diagram according to a first embodiment (Example 1)
Figure 2:
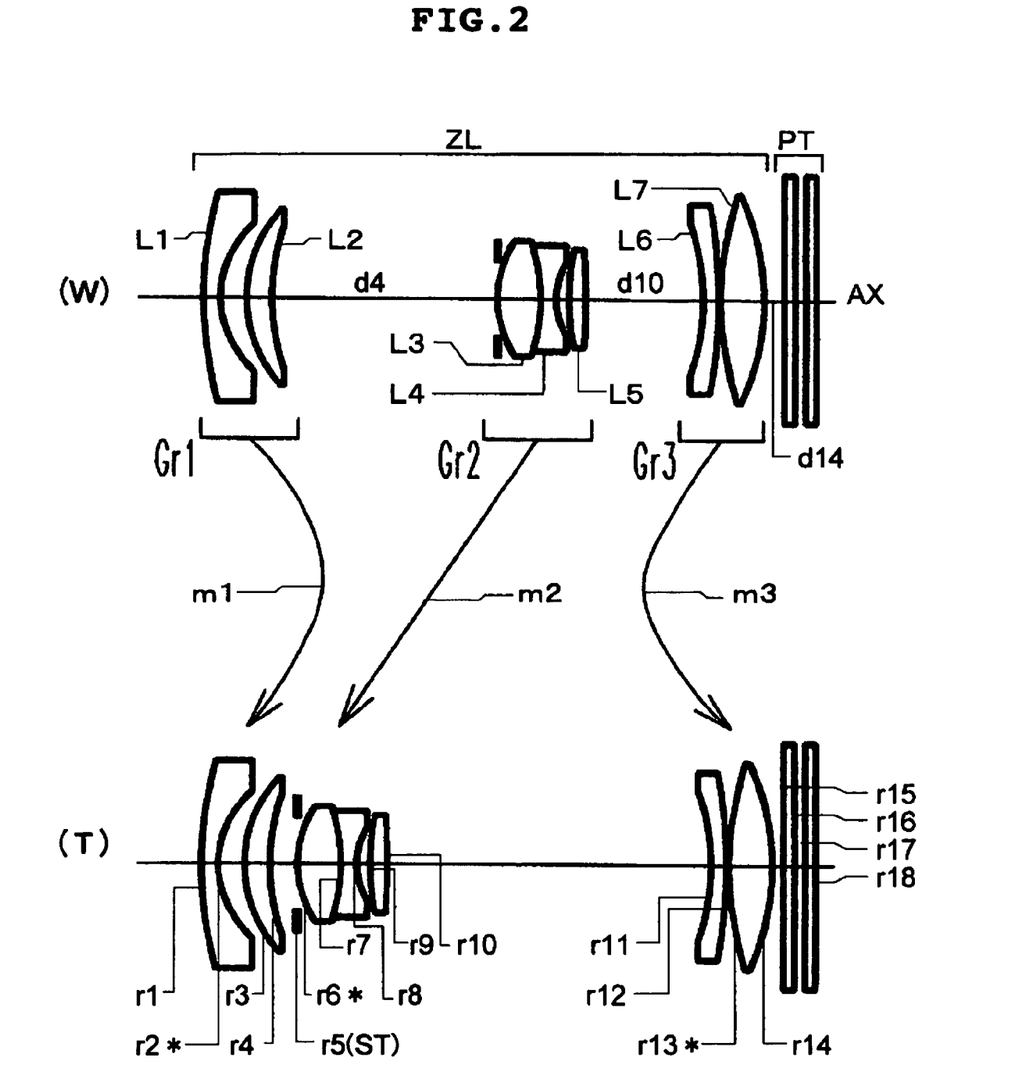
FIG. 2 is a lens configuration diagram according to a second embodiment (Example 2)
Figure 3:
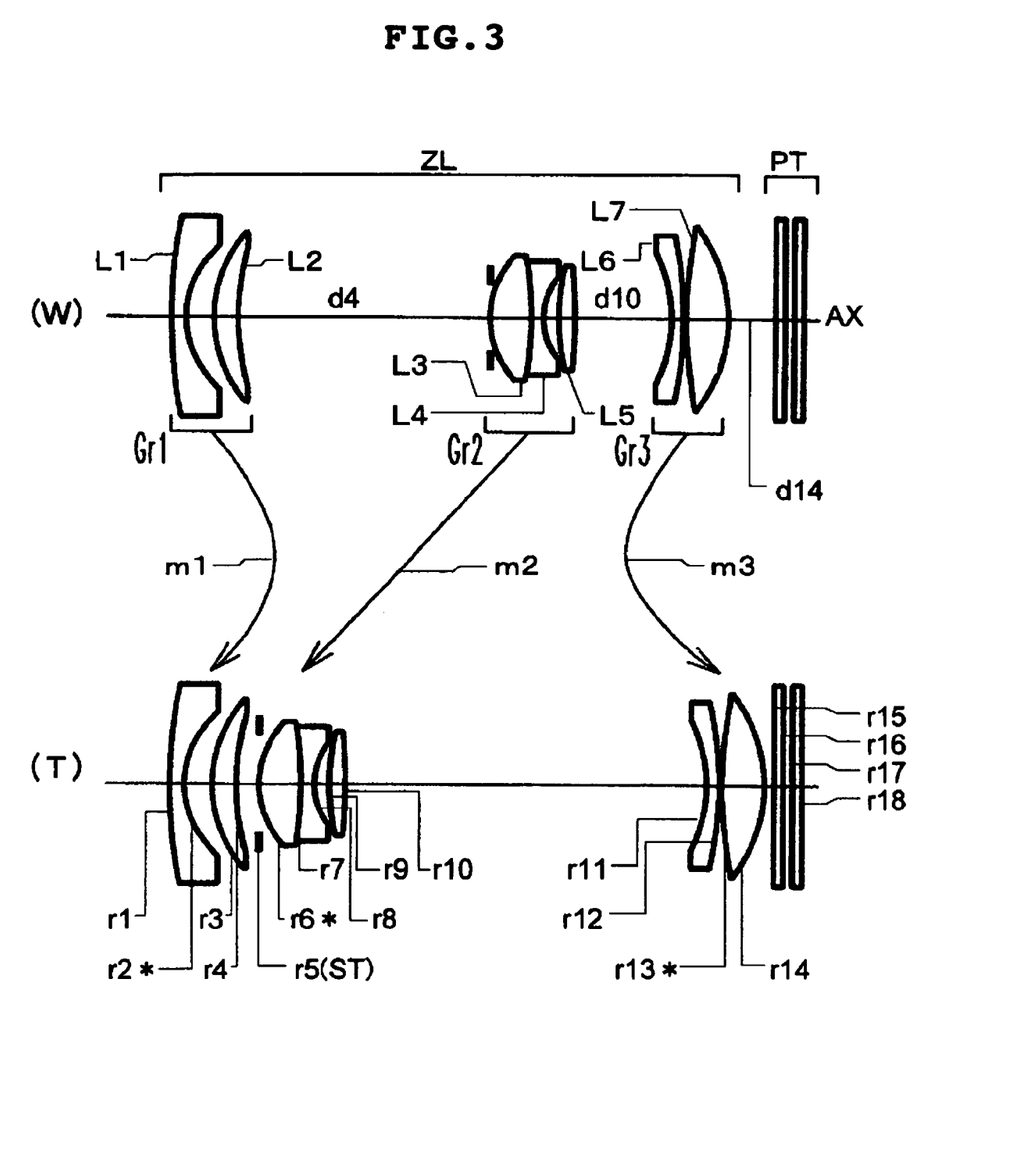
FIG. 3 is a lens configuration diagram according to a third embodiment (Example 3)
Figure 4:
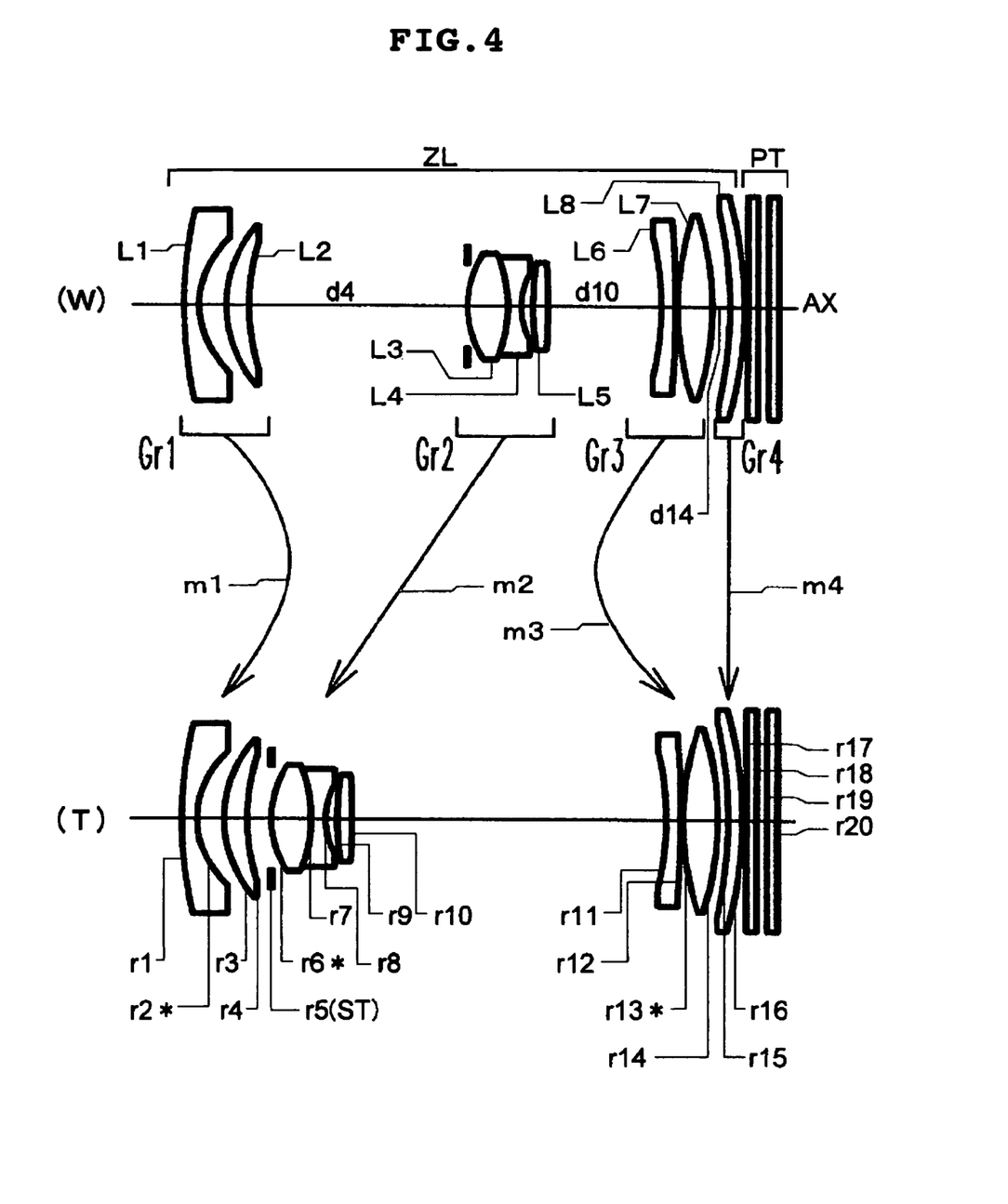
FIG. 4 is a lens configuration diagram according to a fourth embodiment (Example 4)
Figures 5A, 5B, 5C:
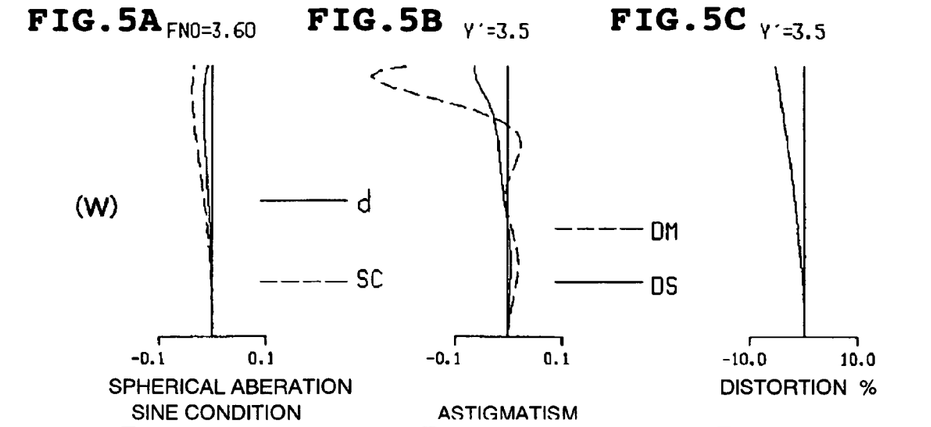
FIGS. 5A-5I are aberration diagrams according to Example 1.
Figures 5D, 5E, 5F:
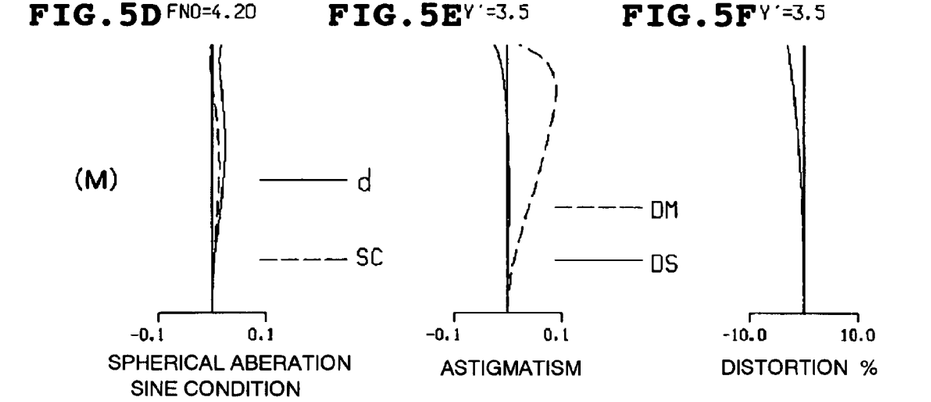
Figures 5G, 5H, 5I:
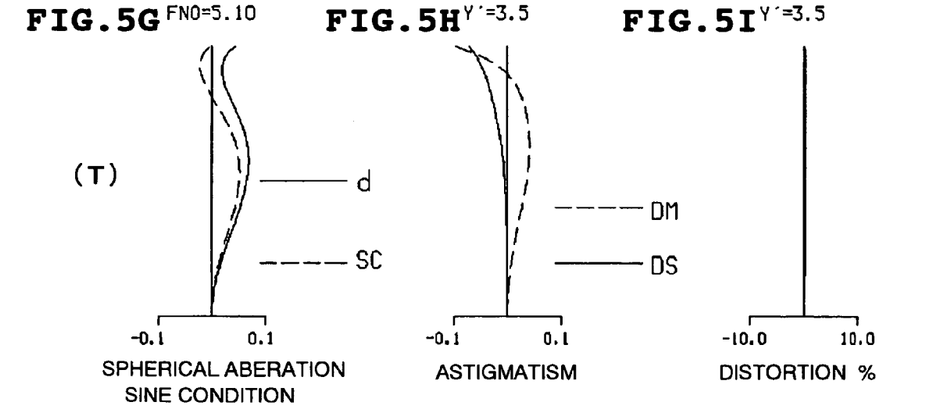
Figures 6A, 6B, 6C:
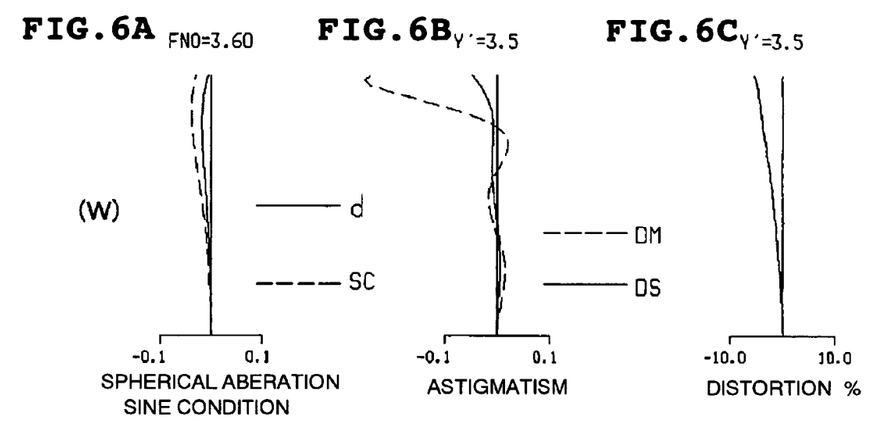
FIGS. 6A-6I are aberration diagrams according to Example 2.
Figures 6D, 6E, 6F:
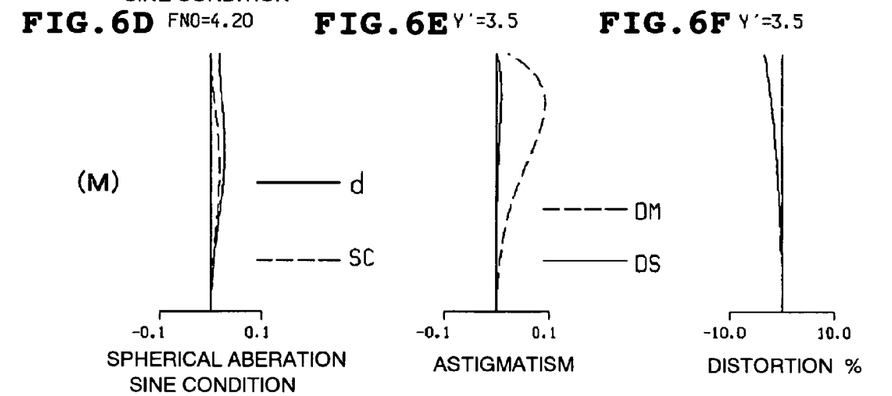
Figures 6G, 6H, 6I:
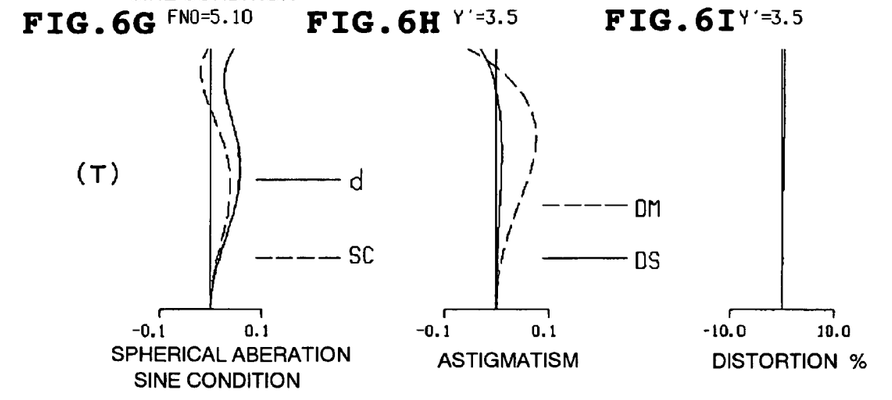
Figures 7A, 7B, 7C:
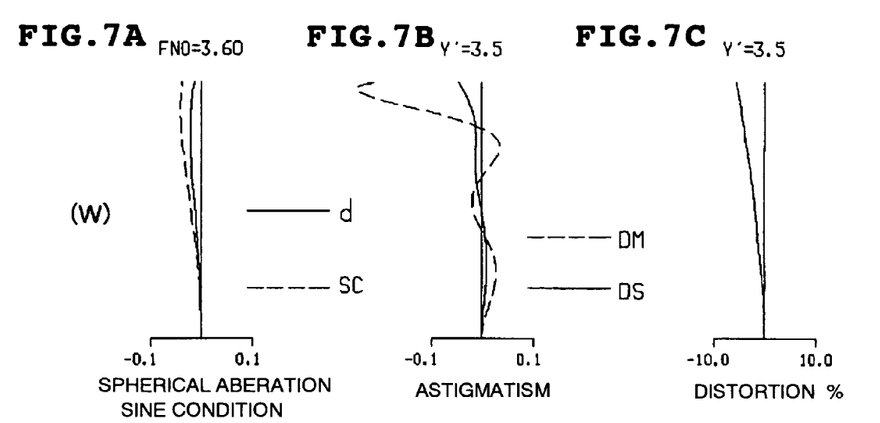
FIGS. 7A-7I are aberration diagrams according to Example 3.
Figures 7D, 7E, 7F:
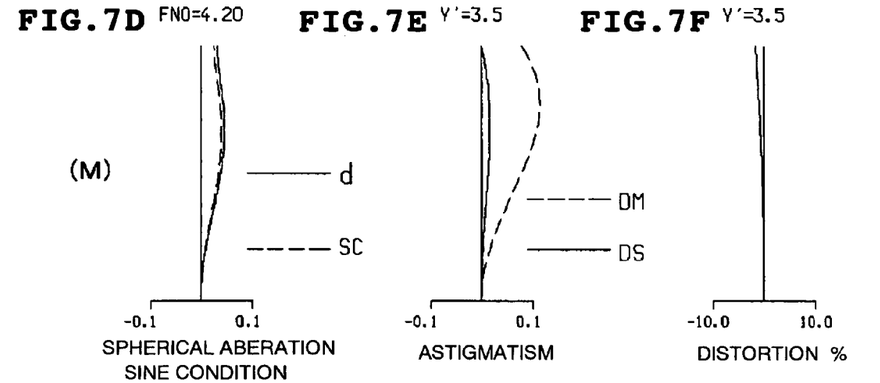
Figures 7G, 7H, 7I:
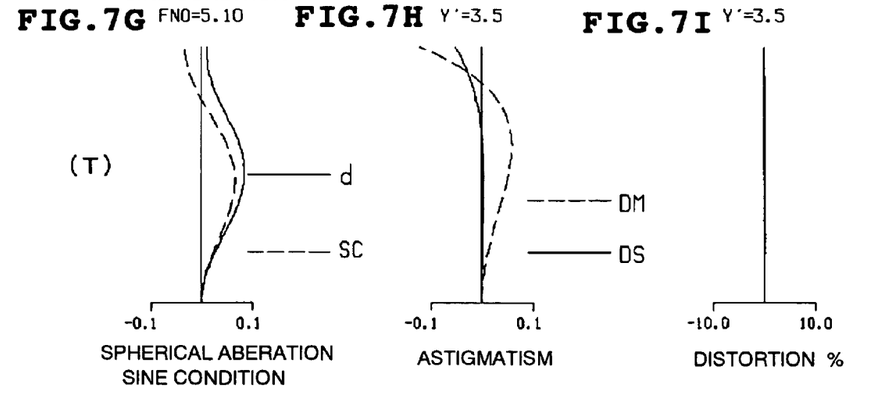
Figures 8A, 8B, 8C:
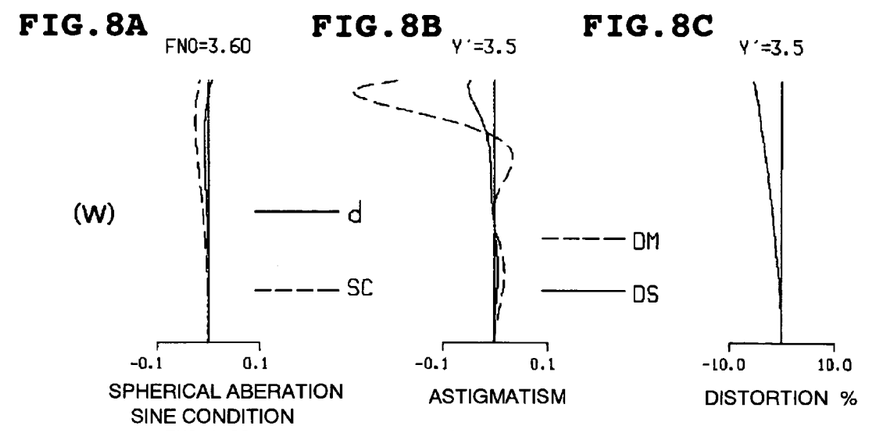
FIGS. 8A-8I are aberration diagrams according to Example 4.
Figures 8D, 8E, 8F:
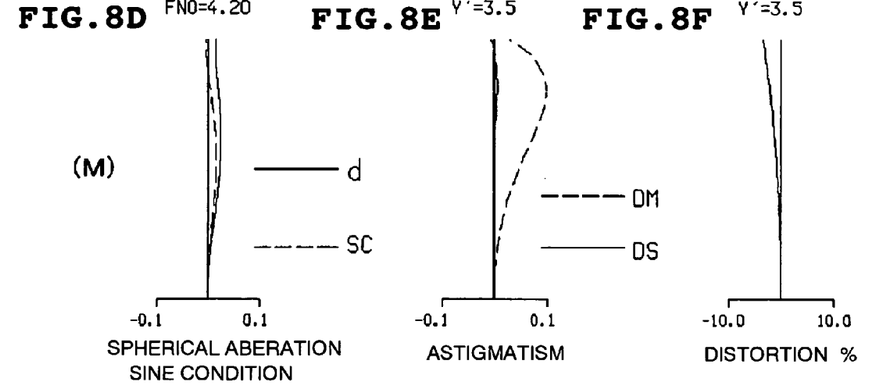
Figures 8G, 8H, 8I:
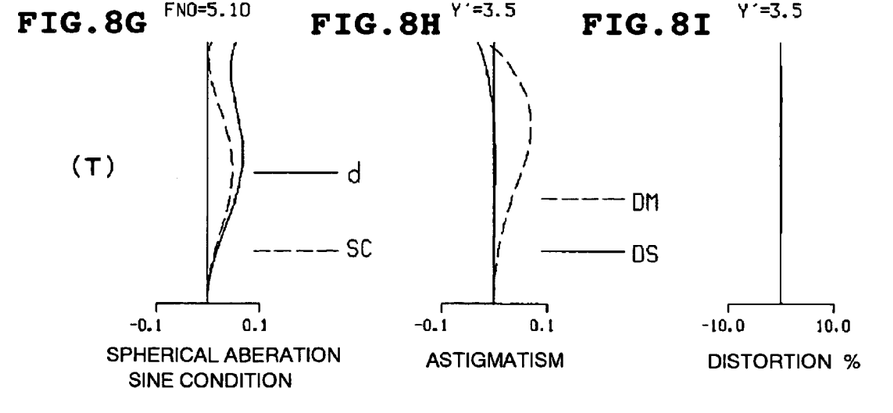
Figure 9:
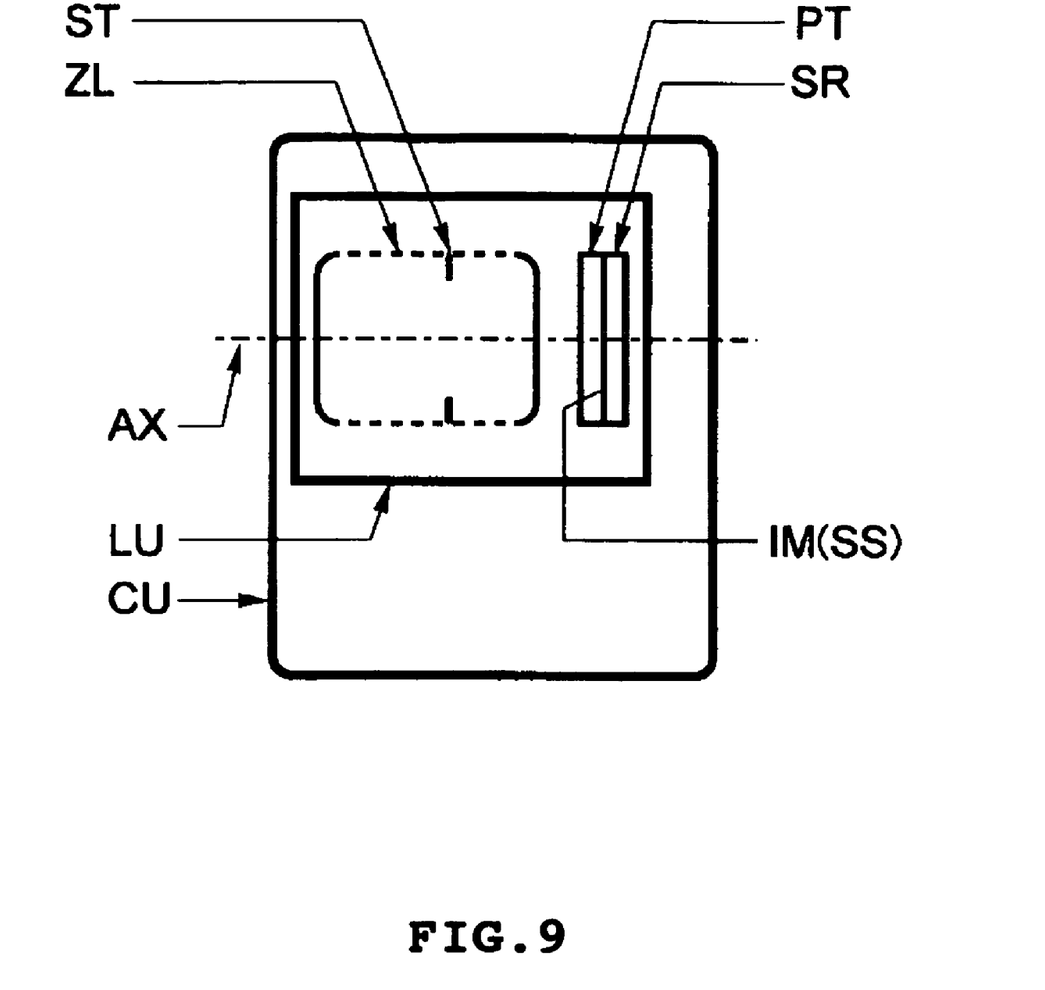
FIG. 9 is a schematic diagram showing an exemplary schematic optical configuration of a camera employing an imaging device.

FIG. 9 is a schematic sectional view of an example of a schematic optical configuration of a camera CU (corresponding to a digital camera, a digital device with image input function, or the like). The imaging device LU installed in the camera CU comprises in order from the object side (that is, the photographic object side): a zoom lens system ZL (corresponding to a variable magnification optical system serving as a shooting lens system; ST: a diaphragm) for forming with variable magnification an optical image (IM: an image surface) of an object; a plane parallel plate PT (corresponding to: an optical filter such as an optical low pass filter and an infrared cut filter arranged when necessary; a cover glass of an image sensor SR; or the like); and an image sensor SR for converting into an electric signal an optical image IM formed on a light acceptance surface SS by the zoom lens system ZL. The imaging device LU constitutes a part of the camera CU corresponding to a digital camera or the like. When a digital camera is constructed from this imaging device LU, in general, the imaging device LU is arranged inside the body of the camera. At that time, when a camera function is to be implemented, a required configuration can be adopted. For example, an imaging device LU having a unit construction may be adopted in a manner attachable to and detachable from the camera body or alternatively in a freely rotatable manner. Alternatively, an imaging device LU having a unit construction may be adopted in a manner attachable to and detachable from a portable information device (such as a portable phone and a PDA) or alternatively in a freely rotatable manner.

The zoom lens system ZL is constructed from a plurality of lens groups. Then, the plurality of lens groups move along the optical axis AX so that the lens group intervals are changed, so that magnification change (that is, zooming) is performed. For example, in first through third embodiments described later, the zoom lens system ZL has a three-group zoom configuration, in order from the object side, consisting of negative, positive, and positive optical power. In a fourth embodiment, the zoom lens system ZL has a four-group zoom configuration, in order from the object side, consisting of negative, positive, positive, and positive optical power. Then, in each embodiment, the first through the third lens groups Gr1-Gr3 constitute a moving group, while the fourth lens group Gr4 in the fourth embodiment constitutes a fixed group. Here, the shooting lens system employed in the imaging device LU is not limited to the zoom lens system ZL. In place of the zoom lens system ZL, a variable magnification optical system of another type (for example, an image formation optical system having a variable focal length, like a vari-focal lens system and a multi-focus switching lens) may be adopted as the shooting lens system.

The optical image to be formed by the zoom lens system ZL passes through an optical low pass filter (corresponding to the plane parallel plate PT in FIG. 9) having predetermined cut-off frequency characteristics determined by the pixel pitch of the image sensor SR, so that its spatial frequency characteristics is adjusted in such a manner that so-called aliasing noise generated in association with conversion into an electric signal should be minimized. This suppresses generation of color moire. However, when the performance near the resolution limit frequency is reduced, the possibility of generation of the noise is avoided without the necessity of use of the optical low pass filter. Further, when a user performs image shooting or viewing through a display system (for example, a liquid crystal display of a portable phone) that is not very sensitive to noise, the shooting lens system requires no optical low pass filter.

Here, the optical low pass filter may be a birefringent type low pass filter, a phase type low pass filter, or the like. The birefringence type low pass filter may be composed of a birefringent material such as quartz the crystal orientation of which is adjusted in a predetermined direction, or alternatively may be composed of a stack of wavelength plates that change the polarization plane. The phase type low pass filter may be that achieves the necessary optical cut-off frequency characteristics on the basis of a diffraction effect.

The image sensor SR may be, for example, a solid state image pickup device such as a CCD (Charge Coupled Device) having a plurality of pixels and a CMOS (Complementary Metal Oxide Semiconductor) sensor. Then, the optical image formed on the light acceptance surface SS of the image sensor SR by the zoom lens system ZL is converted into an electric signal by the image sensor SR. The signal generated by the image sensor SR is processed by predetermined digital image processing, image compression processing, and the like depending on the necessity, and then recorded into a memory (a semiconductor memory, an optical disk, or the like) as a digital video signal, or alternatively transmitted to another device through a cable or after converted into an infrared signal.

Here, in the imaging device LU shown in FIG. 9, the zoom lens system ZL performs reduction projection from the photographic object side serving as the enlargement side to the image sensor SR side serving as the reduction side. When a display device (such as a liquid crystal display device) for displaying a two-dimensional image is used in place of the image sensor SR while the zoom lens system ZL is used as a projection lens system, an image projection device is constructed that performs enlargement projection from the image display surface on the reduction side to the screen surface on the enlargement side. That is, the zoom lens system ZL according to each embodiment described below may be used as a projection lens system as well as a shooting lens system.

FIGS. 1-4 are lens configuration diagrams respectively corresponding to the zoom lens system ZL according to first through fourth embodiments. Each figure shows optical sectional views of a lens arrangement at a wide-angle limit (W) and a telephoto limit (T). In each lens configuration diagram, each surface designated by ri (i=1, 2, 3, . . . ) indicates the i-th surface counted from the object side (an asterisk * on ri indicates an aspheric surface). Each on-the-axis interval designated by di (i=1, 2, 3, . . . ) indicates a variable interval that varies in zooming among the i-th on-the-axis intervals counted from the object side. Further, in each lens configuration diagram, arrows m1, m2, and m3 schematically indicate the movement (that is, the positional change relative to the image surface IM) of the first lens group Gr1, the second lens group Gr2, and the third lens group Gr3, respectively, in zooming from the wide-angle limit (W) to the telephoto limit (T). An arrow m4 in FIG. 4 indicates that the position of the fourth lens group Gr4 is fixed in zooming. Here, in each embodiment, the second lens group Gr2 has a diaphragm ST on the most object side, while the diaphragm ST performs zoom movement as a part of the second lens group Gr2 (an arrow m2).

The zoom lens system ZL according to each of the first through the third embodiments has a three-group zoom configuration that comprises three lens groups, in order from the object side, consisting of: a first lens group Gr1 having negative optical power (the optical power is defined as the inverse of the focal length); a second lens group Gr2 having positive optical power; and a third lens group Gr3 having positive optical power, wherein each interval between the respective lens groups is changed so that zooming is performed. Further, the zoom lens system ZL according to the fourth embodiment has a four-group zoom configuration that comprises four lens groups, in order from the object side, consisting of: a first lens group Gr1 having negative optical power; a second lens group Gr2 having positive optical power; a third lens group Gr3 having positive optical power; and a fourth lens group Gr4 having positive optical power, wherein each interval between the respective lens groups is changed so that zooming is performed. The lens configuration of each embodiment is described below in detail.

In the first through the third embodiments (FIGS. 1-3), in a three-group zoom configuration of negative, positive, and positive, each lens group is constructed as follows. The first lens group Gr1 comprises in order from the object side: a negative meniscus lens (a first lens L1) concave to the image side and having an aspheric image side surface; and a positive meniscus lens (a second lens L2) convex to the object side. The second lens group Gr2 comprises in order from the object side: a diaphragm ST; a cemented lens composed of a bi-convex positive lens (a third lens L3) having an aspheric object side surface and a bi-concave negative lens (a fourth lens L4); and a bi-convex positive lens (a fifth lens L5). The third lens group Gr3 comprises in order from the object side: a negative meniscus lens (a sixth lens L6) concave to the object side; and a bi-convex positive lens (a seventh lens L7) having an aspheric object side surface. In zooming from the wide-angle limit (W) to the telephoto limit (T), the first lens group Gr1 moves in a U-turn manner, that is, moves to the image side first and then from the image side to the object side (in other words, the lens group moves along a locus convex to the image side). Further, the second lens group Gr2 moves monotonically (that is, almost linearly) to the object side, while the third lens group Gr3 moves in a U-turn manner, that is, moves to the object side first and then from the object side to the image side (in other words, the lens group moves along a locus convex to the object side).

In the fourth embodiment (FIG. 4), in a four-group zoom configuration of negative, positive, positive, and positive, each lens group is constructed as follows. The first lens group Gr1 comprises in order from the object side: a negative meniscus lens (a first lens L1) concave to the image side and having an aspheric image side surface; and a positive meniscus lens (a second lens L2) convex to the object side. The second lens group Gr2 comprises in order from the object side: a diaphragm ST; a cemented lens composed of a bi-convex positive lens (a third lens L3) having an aspheric object side surface and a bi-concave negative lens (a fourth lens L4); and a bi-convex positive lens (a fifth lens L5). The third lens group Gr3 comprises in order from the object side: a negative meniscus lens (a sixth lens L6) concave to the object side; and a bi-convex positive lens (a seventh lens L7) having an aspheric object side surface. The fourth lens group Gr4 comprises solely a positive meniscus lens (an eighth lens L8) convex to the image side. In zooming from the wide-angle limit (W) to the telephoto limit (T), the first lens group Gr1 moves in a U-turn manner, that is, moves to the image side first and then from the image side to the object side (in other words, the lens group moves along a locus convex to the image side). Further, the second lens group Gr2 moves monotonically (that is, almost linearly) to the object side, while the third lens group Gr3 moves in a U-turn manner, that is, moves to the object side first and then from the object side to the image side (in other words, the lens group moves along a locus convex to the object side). On the other hand, the zoom position of the fourth lens group Gr4 is fixed.

In general, thickness reduction of a variable magnification optical system at the time of barrel retraction can be achieved by thickness reduction of each lens group. Nevertheless, in implementation of the thickness reduction at the time of barrel retraction, unless the overall lens length at the time of image shooting is reduced, an increase in the amount of draw-out from the retracted state causes complexity in the lens barrel configuration, and hence causes an increase in the lens barrel diameter. Thus, in the variable magnification optical system according to each embodiment for forming with variable magnification an optical image of an object onto the light acceptance surface of the image sensor, in addition to the thickness reduction in the retracted state, reduction is necessary also in the overall lens length in the image shooting state, especially in the overall lens length at a telephoto limit.

From the above-mentioned point of view, in the variable magnification optical system according to each embodiment of the type comprising at least, in order from the object side, a first lens group having negative optical power, a second lens group having positive optical power, and a third lens group having positive optical power, a configuration is preferable that in magnification change from the wide-angle limit to the telephoto limit, the first lens group moves along a locus convex to the image side, the second lens group moves monotonically to the object side, and the third lens group moves along a locus convex to the object side. When the movement of the lens groups are set up as described here, magnification change can be performed efficiently with keeping the overall lens length reduced. Further, when the overall lens length in the image shooting state (especially the overall lens length at a telephoto limit) is reduced, a lens barrel configuration can easily be constructed that achieves thickness reduction in the retracted state. Further, when the third lens group moves along a locus convex to the object side, the light beam incident angle onto the light acceptance surface of the image sensor is maintained at an appropriate angle so that satisfactory telecentricity is ensured. Thus, a variable magnification optical system can be realized in which reduction of the thickness in the retracted state and reduction of the overall lens length in the image shooting state are achieved with maintaining satisfactory optical performance. Then, when an imaging device employing this variable magnification optical system is used in a device such as a digital camera, its thickness reduction, weight reduction, and size reduction are achieved as well as cost reduction, performance improvement, function improvement, and the like.

Further, in each embodiment, the third lens group Gr3 comprises two lenses L6 and L7. As such, for the purpose of reducing the overall lens length at the time of image shooting, it is preferable that the third lens group comprises two or more lenses. When the optical power of the first lens group or the second lens group is increased for the purpose of reducing the overall lens length, aberration caused by this need be compensated. In order that the aberration compensation should be achieved effectively, it is preferable that the third lens group is constructed from two or more lenses. This configuration permits reduction of the overall lens length in the image shooting state (especially the overall lens length at a telephoto limit). Further, when the third lens group is constructed from two lenses consisting of a negative lens L6 and a positive lens L7 as in each embodiment, satisfactory aberration compensation can be performed in such a manner that weight reduction, size reduction, and cost reduction are also achieved simultaneously.

In each embodiment, the third lens group Gr3 has a two-lens configuration, in order from the object side, consisting of a negative lens L6 and a positive lens L7. Further, an air interval is provided between the two lenses. As such, it is preferable that the third lens group Gr3 has a two-lens configuration, in order from the object side, consisting of a negative lens and a positive lens, and that an air interval is provided between the two lenses (that is, the two lenses are not cemented with each other). According to this configuration, the air interval makes appropriate the light beam incident angle onto the light acceptance surface of the image sensor, so that satisfactory telecentricity is ensured.

In each embodiment, in the third lens group Gr3, the negative lens L6 has a meniscus shape convex to the image side, while the positive lens L7 has a shape convex to the image side. As such, in the third lens group composed of two lenses having negative and positive optical power respectively, it is preferable that the negative lens has a meniscus shape convex to the image side, and that the positive lens has a shape convex to the image side. This configuration suppresses aberration fluctuation (for example, magnification chromatic aberration and curvature of field) caused by the movement of the third lens group in zooming or focusing. Further, the image side surface of the positive lens is formed convex, the positive lens can serve as a condenser lens.

In each embodiment, in the third lens group Gr3, an air lens having positive optical power is formed in the air interval between the negative lens L6 and the positive lens L7. As such, in the third lens group composed of two lenses having negative and positive optical power respectively, it is preferable that an air lens having positive optical power is formed in the air interval between the negative lens and the positive lens. According to this configuration, the air lens having positive optical power assists the effect of the two negative and positive lenses, so that the air lens permits satisfactory aberration compensation and ensures satisfactory telecentricity.

In each embodiment, an aspheric surface is provided in the third lens group Gr3. As such, it is preferable that an aspheric surface is provided in the third lens group. When an aspheric surface is provided in the third lens group, aberration fluctuation (for example, curvature of field and distortion aberration) caused by the movement of the third lens group in zooming or focusing can be suppressed more effectively. This configuration can contribute to size reduction in the variable magnification optical system and the imaging device.

As for the interval between the second and the third lens groups, it is preferable that the following condition (1) is satisfied.

$$0.8 < T23w/fw < 1.7 \quad (1)$$

where

T23w is the on-the-axis air interval between the second lens group and the third lens group at a wide-angle limit, and fw is the focal length of the entire system at a wide-angle limit.

The condition (1) sets forth a preferable condition range concerning the interval between the second and the third lens groups. When the value goes below the lower limit of the condition (1), an increase is caused in the fluctuation of the light beam incident angle onto the light acceptance surface of the image sensor generated by the movement of the third lens group at the time of magnification change. In contrast, when the value exceeds the upper limit of the condition (1), a moving space for the second lens group is reduced at the time of magnification change so that the optical power of the second lens group becomes excessively strong. This aggravates various kinds of aberrations, especially spherical aberration on the telephoto side. In order that these aberrations should be compensated, the number of lenses need be increased. This results in an optical configuration not suitable for thickness reduction.

It is more preferable that the following condition (1a) is satisfied.

$$0.9 < T23w/fw < 1.5 \quad (1a)$$

This condition (1a) sets forth a more preferable condition range within the condition range set forth by the above-mentioned condition (1), from the above-mentioned point of view and the like.

As for the overall length of the variable magnification optical system, it is preferable that the following condition (2) is satisfied in the variable magnification range from the wide-angle limit to the telephoto limit.

$$2.1 < TLmax/(fw \cdot ft)^{0.5} < 3.6 \quad (2)$$

where

TLmax is the maximum value of the on-the-axis distance from the top of the most object side lens surface to the image surface, fw is the focal length of the entire system at a wide-angle limit, and ft is the focal length of the entire system at a telephoto limit.

The condition (2) sets forth a preferable condition range concerning the overall length of the variable magnification optical system in the image shooting state from the wide-angle limit to the telephoto limit. When the value exceeds the upper limit of the condition (2), the amount of movement of the first lens group necessary in the draw-out from the retracted state becomes excessively large, and hence causes complexity in the mechanical configuration. In contrast, when the value goes below the lower limit of the condition (2), a moving space for magnification change is reduced so that the optical power of the second lens group becomes excessively strong. This aggravates spherical aberration, curvature of field, and the like.

It is more preferable that the following condition (2a) is satisfied.

$$2.5 < TLmax/(fw \cdot ft)^{0.5} < 3.5 \quad (2a)$$

This condition (2a) sets forth a more preferable condition range within the condition range set forth by the above-mentioned condition (2), from the above-mentioned point of view and the like.

As for the optical power of the second and the third lens groups, it is preferable that the following condition (3) is satisfied.

$$f3/f2 < 1.95 \quad (3)$$

where f2 is the focal length of the second lens group, and
f3 is the composite focal length of the third lens group.

The condition (3) sets forth a preferable condition range concerning the optical power ratio between the second lens group and the third lens group. When the focal length f3 of the third lens group increases so that the value exceeds the upper limit of the condition (3), the optical power of the third lens group becomes small. Thus, curvature of field cannot be suppressed in the entire variable magnification range. When the focal length f2 of the second lens group decreases so that the value exceeds the upper limit of the condition (3), the optical power of the second lens group becomes excessively strong. This aggravates various kinds of aberrations, especially spherical aberration on the telephoto side. In order that these aberrations should be compensated, the number of lenses need be increased. This results in an optical configuration not suitable for thickness reduction.

It is more preferable that the following condition (3a) is satisfied.

$$f3/f2 < 1.86 \quad (3a)$$

This condition (3a) sets forth a more preferable condition range within the condition range set forth by the above-mentioned condition (3), from the above-mentioned point of view and the like.

In the first through the third embodiments, a three-group configuration of negative, positive, and positive has been adopted. However, the above-mentioned manner of movement of the lens groups is not limited to the three-group configuration of negative, positive, and positive. That is, a similar effect can be obtained also in a variable magnification optical system composed of four or more lens groups. However, from the perspective of satisfactory trade-off between the thickness reduction at the time of barrel retraction and the overall length reduction at the time of image shooting, it is preferable that the system is constructed from three lens groups consisting of the first through the third lens groups as in the first through the third embodiments. That is, when the three-group configuration of negative, positive, and positive is adopted, satisfactory trade-off is achieved between the thickness at the time of barrel retraction and the maximum value TLmax of the on-the-axis distance from the top of the most object side lens surface to the image surface. Thus, this configuration can contribute to size reduction in the camera.

In the fourth embodiment, a four-group configuration of negative, positive, positive, and positive is adopted. It is preferable that a fourth lens group having positive optical power is further included on the image side of the third lens group as in the fourth embodiment so that the system is composed of four lens groups consisting of the first through the fourth lens groups. The condenser lens function of the fourth lens group ensures satisfactory telecentricity. Here, the configuration that a condenser lens function is imparted to the last lens group is not limited to the four-group configuration of negative, positive, positive, and positive. That is, a similar effect can be obtained also in a variable magnification optical system composed of five or more lens groups.

In a variable magnification optical system having a four-group configuration including the fourth lens group having positive optical power on the image side of the third lens group as in the fourth embodiment, it is preferable that the position of the fourth lens group is fixed in magnification change from the wide-angle limit to the telephoto limit. In general, it is preferable that the principal ray incident on the image sensor is approximately perpendicular to the light acceptance surface of the image sensor (telecentricity). Nevertheless, when the overall lens length of the variable magnification optical system in the image shooting state is reduced, the telecentricity becomes difficult to be achieved. Thus, in order that satisfactory telecentricity should be maintained, the fourth lens group having a fixed variable magnification position is preferred to be provided. Further, when the fourth lens group having a fixed variable magnification position is provided, entering of dusts can be avoided that could cause a large problem in the electronic image sensor. Further, it is preferable that the fourth lens group is constructed from one positive lens as in the fourth embodiment. When the fourth lens group is constructed from one positive lens, a cost increase is prevented that could be caused by an increase in the overall length and the number of lenses. At the same time, satisfactory telecentricity is obtained. Further, when the fourth lens group is composed of one plastic lens, cost reduction and weight reduce can be achieved. Thus, this configuration is more preferable.

In each embodiment, an aspheric surface is included in each of the first lens group Gr1, the second lens group Gr2, and the third lens group Gr3, while the first lens group Gr1 has a two-lens configuration, in order from the object side, consisting of a negative lens L1 and a positive lens L2, and. while an air interval is provided between the two lenses. Further, the second lens group Gr2 has a three-lens configuration, while two of these lenses form a cemented lens composed of a positive lens L3 and a negative lens L4. As such, it is preferable that at least one aspheric surface is included in each of the first through the third lens groups, while the first lens group has a two-lens configuration, in order from the object side, consisting of a negative lens and a positive lens, and while an air interval is provided between the two lenses (that is, the two lenses are not cemented with each other), and that the second lens group has a three-lens configuration, while two of these lenses form a cemented lens composed of a positive lens and a negative lens.

As described above, the configuration that an aspheric surface is included in the first lens group is effective in compensation of distortion aberration. Further, the configuration that an aspheric surface is included in the second lens group is effective in compensation of spherical aberration (mainly spherical aberration on the telephoto side). Furthermore, the configuration that an aspheric surface is included in the third lens group is effective in compensation of distortion aberration and curvature of field. The configuration that the first lens group is constructed from two negative and positive lenses having an air interval in between is effective in reducing the front lens diameter of the variable magnification optical system. Further, the configuration that the second lens group is constructed from three lenses including a positive and negative cemented lens is effective in correcting on-the-axis chromatic aberration effectively. Such satisfactory aberration compensation in these lens groups suppresses the thickness of each lens group, and hence permits thickness reduction at the time of barrel retraction. Thus, a variable magnification optical system (for example, a zoom lens system) can be constructed from a small number of lenses. This permits simultaneously the thickness reduction at the time of barrel retraction and the ensuring of the lens performance in the entire variable magnification range (for example, the entire zoom range).

As for the variable magnification ratio, it is preferable that the following condition (4) is satisfied.

$$2.1 < ft/fw < 4.3 \tag{4}$$

where fw is the focal length of the entire system at a wide-angle limit, and ft is the focal length of the entire system at a telephoto limit.

The condition (4) sets forth a preferable condition range concerning the variable magnification ratio. In a zoom lens having a value below the lower limit of the condition (4), the effect to be obtained when the third lens group is constructed from two or more lenses is small. Instead, the thickness increases at the time of barrel retraction. When the value exceeds the upper limit of the condition (4), the difference increases in the F-numbers at a wide-angle limit and at a telephoto limit. That is, the F-number at a wide-angle limit becomes excessively bright so that spherical aberration is aggravated.

It is more preferable that the following condition (1a) is satisfied.

$$2.4 < ft/fw < 4.0 \tag{4a}$$

This condition (4a) sets forth a more preferable condition range within the condition range set forth by the above-mentioned condition (4), from the above-mentioned point of view and the like.

As for the lateral magnification of the third lens group, it is preferable that the following condition (5) is satisfied.

$$0.8 < \beta 3w/\beta 3t < 1.0 \tag{5}$$

where

β3w is the lateral magnification of the third lens group at a wide-angle limit, and β3t is the lateral magnification of the third lens group at a telephoto limit.

The condition (5) sets forth a preferable condition range concerning the lateral magnification of the third lens group. When the condition (5) is satisfied, contribution of the third lens group to the variable magnification can be increased with suppressing fluctuation in the light beam incident angle onto the light acceptance surface of the image sensor at the time of magnification change. When the value goes below the lower limit of the condition (5), the third lens group goes excessively far from the image surface. This causes an increase in the fluctuation in the light beam incident angle onto the image sensor in magnification change from the wide-angle limit to the telephoto limit. In contrast, when the value exceeds the upper limit of the condition (5), the third lens group operates such as to reduce the variable magnification ratio from the wide-angle limit to the telephoto limit. In order that this effect should be compensated, the necessary amount of movement of the second lens group increases so that the overall lens length increases.

It is more preferable that the following condition (5a) is satisfied.

$$0.85 < \beta 3w/\beta 3t < 0.98 \tag{5a}$$

This condition (5a) sets forth a more preferable condition range within the condition range set forth by the above-mentioned condition (5), from the above-mentioned point of view and the like.

The zoom lens system according to each embodiment is composed of refractive type lenses that deflect the incident light by refraction (that is, lenses of a type in which deflection is achieved at the interface between media each having a distinct refractive index). However, employable lenses are not limited to this type. Employable lens types include: a diffractive type lens that deflects the incident light by diffraction; a refractive-diffractive hybrid type lens that deflects the incident light by a combination of diffraction and refraction; and a gradient index type lens that deflects the incident light by distribution of refractive index in the medium. Nevertheless, the gradient index type lens having a refractive index distribution within the medium needs a complicated process and hence causes a cost increase. Thus, it is preferable that homogeneous material lenses having a uniform refractive index distribution are used. Further, the zoom lens system ZL according to each embodiment includes a diaphragm ST as an optical element other than the lenses. In addition, for example, a light flux restriction plate (such as a flare cutter) for cutting unnecessary light may be arranged when necessary.

EXAMPLES

The configuration and the like of the zoom lens system implemented according to the present invention are described below in further detail with reference to construction data and the like. Examples 1-4 described below are numerical examples respectively corresponding to the first through the fourth embodiments described above. The optical configuration diagrams (FIGS. 1-4) showing the first through the fourth embodiments correspond respectively to the lens configurations of Examples 1-4.

Tables 1-8 show the construction data of Examples 1-4. Table 9 shows data such as the values corresponding to the condition of each example. In the basic optical configuration (i: surface number) shown in Tables 1, 3, 5, and 7, ri (i=1, 2, 3, . . . ) indicates the curvature radius (mm) of the i-th surface counted from the object side, while di (i=1, 2, 3, . . . ) indicates the on-the-axis surface interval (mm) between the i-th surface and the (i+1)-th surface counted from the object side. Ni (i=1, 2, 3, . . . ) and vi (i=1, 2, 3, . . . ) indicate respectively the refractive index (Nd) for the d-line(587.56 nm) and the Abbe number (vd) of the optical material located in the on-the-axis surface interval di. Further, the on-the-axis surface interval di. Further, the on-the-axis surface interval di that varies in zooming is a variable air interval between the wide-angle limit (the shortest focal length state, W), the middle (the medium focal length state, M), and the telephoto limit (the longest focal length state, T). Symbols f and FNO indicate respectively the focal length (mm) and the F-number of the entire system corresponding to the focal length states (W), (M), and (T).

Each surface having a * mark on the data of curvature radius ri indicates an aspheric surface (such as an aspheric refractive optical surface and a surface having a refraction effect equivalent to that of an aspheric surface). This surface is defines by the following formula (AS) expressing an aspheric surface shape. Tables 2, 4, 6, and 8 show aspheric surface data of the respective examples. Here, the coefficient in each blank field indicates 0. Further, E-n=×10$^{-n}$ for the entire data.

$$X(H)=(CO \cdot H^2)/\{1+(1-\epsilon \cdot CO^2 \cdot H^2)^{0.5}\}+\Sigma(Aj \cdot H^j) \quad (AS)$$

where in the formula (AS),

X(H) is the amount of displacement in the optical axis AX direction at a position of height H (relative to surface top), H is the height in a direction perpendicular to the optical axis AX, CO is the near-the-axis curvature (1/ri), $\epsilon$ is the second-order surface parameter, and Aj is the j-th order aspheric coefficient.

FIGS. 5A-5I are aberration diagrams corresponding to Examples 1. FIGS. 6A-6I are aberration diagrams corresponding to Examples 2. FIGS. 7A-7I are aberration diagrams corresponding to Examples 3. FIGS. 8A-8I are aberration diagrams corresponding to Example 4. Parts (W), (M), and (T) indicate various kinds of aberrations in the infinity in-focus condition at a wide-angle limit, a middle position, and a telephoto limit, respectively. Each figure shows, in order from the left, the spherical aberration (A, D, G), the astigmatism (B, E, H), and the distortion aberration (C, F, I). FNO indicates the F-number, while Y' (mm) indicates the maximum image height (corresponding to the distance from the optical axis AX) on the light acceptance surface SS of the image sensor SR. In each spherical aberration diagram, a solid line d shows the spherical aberration (mm) for the d-line, while a dashed line SC shows a sine condition insufficiency (mm). In each astigmatism diagram, a dashed line DM and a solid line DS show the astigmatism (mm) for the d-line respectively in the meridional plane and the sagittal plane. Further, in each distortion aberration diagram, a solid line shows the distortion (%) for the d-line.

According to the present invention, the feature in the movement of the lens groups permits efficient variable magnification under the restriction of a short overall length, and maintains appropriately the light beam incident angle onto the light acceptance surface of the image sensor, so that satisfactory telecentricity is ensured. Thus, a variable magnification optical system can be realized in which reduction of the thickness in the retracted state and reduction of the overall lens length in the image shooting state are achieved with maintaining satisfactory optical performance. Further, an imaging device employing this variable magnification optical system can also be realized. Then, when the imaging device according to the present invention is used in a device such as a digital camera, its thickness reduction, weight reduction, and size reduction are achieved as well as cost reduction, performance improvement, function improvement, and the like.

TABLE 1

EXAMPLE 1
POSITION (W)~(M)~(T)
f[mm] 5.90~11.81~16.89
FNO 3.60~4.20~5.10

| i | ri[mm] | | di[mm] | Ni | vi | |
|---|---|---|---|---|---|---|
| 1 | 21.246 | | 0.800 | 1.85000 | 40.04 | L1 |
| 2 | 4.220 | * | 1.247 | | | Gr1(-) |
| 3 | 5.998 | | 1.191 | 1.81895 | 23.12 | L2 |
| 4 | 11.198 | | 10.731~1.742~1.211 | | | |
| 5 | ∞ | | 0.000 | | | ST |
| 6 | 4.512 | * | 2.015 | 1.85000 | 40.04 | L3 |
| 7 | -8.371 | | 0.710 | 1.70280 | 26.43 | L4 |
| 8 | 3.442 | | 0.615 | | | Gr2(+) |

TABLE 1-continued

EXAMPLE 1
POSITION (W)~(M)~(T)
f[mm] 5.90~11.81~16.89
FNO 3.60~4.20~5.10

| i | ri[mm] | | di[mm] | Ni | vi | |
|---|---|---|---|---|---|---|
| 9 | 12.620 | | 0.789 | 1.70349 | 42.65 | L5 |
| 10 | -27.987 | | 5.710~8.993~15.989 | | | |
| 11 | -12.185 | | 0.700 | 1.74670 | 24.40 | L6 |
| 12 | -43.363 | | 0.100 | | | Gr3(+) |
| 13 | 13.761 | * | 1.831 | 1.71348 | 53.06 | L7 |
| 14 | -14.006 | | 1.257~3.816~0.500 | | | |
| 15 | ∞ | | 0.500 | 1.54426 | 69.60 | PT |
| 16 | ∞ | | 0.500 | | | |
| 17 | ∞ | | 0.500 | 1.51680 | 64.20 | |
| 18 | ∞ | | 0.800 | | | |

TABLE 2

EXAMPLE 1
ASPHERIC SURFACE DATA OF i-th SURFACE (*)

| | 2nd SURFACE | 6th SURFACE | 13th SURFACE |
|---|---|---|---|
| $\epsilon$ | 1.0000 | 1.0000 | 1.0000 |
| A4 | -0.47608656E-3 | -0.75860269E-3 | -0.24505436E-3 |
| A6 | -0.80680127E-4 | -0.26398771E-4 | 0.76993986E-5 |
| A8 | 0.56917948E-5 | -0.19583039E-5 | -0.42542935E-6 |
| A10 | -0.45353733E-6 | -0.12760804E-6 | 0.12290292E-7 |

TABLE 3

EXAMPLE 2
POSITION (W)~(M)~(T)
f[mm] 5.90~11.81~16.89
FNO 3.60~4.20~5.10

| i | ri[mm] | | di[mm] | Ni | vi | |
|---|---|---|---|---|---|---|
| 1 | 17.369 | | 0.800 | 1.95000 | 40.00 | L1 |
| 2 | 4.228 | * | 1.208 | | | Gr1(-) |
| 3 | 5.986 | | 1.161 | 1.96771 | 23.59 | L2 |
| 4 | 10.101 | | 10.373~1.370~1.231 | | | |
| 5 | ∞ | | 0.000 | | | ST |
| 6 | 4.678 | * | 1.972 | 1.93741 | 42.03 | L3 |
| 7 | -8.488 | | 0.710 | 1.68040 | 25.66 | L4 |
| 8 | 3.227 | | 0.611 | | | Gr2(+) |
| 9 | 12.031 | | 0.750 | 1.61660 | 29.47 | L5 |
| 10 | -51.127 | | 5.403~7.547~14.969 | | | |
| 11 | -10.276 | | 0.700 | 1.96316 | 28.37 | L6 |
| 12 | -23.992 | | 0.100 | | | Gr3(+) |
| 13 | 13.168 | * | 1.986 | 1.68942 | 61.49 | L7 |
| 14 | -11.674 | | 0.923~4.441~0.500 | | | |
| 15 | ∞ | | 0.500 | 1.54426 | 69.60 | PT |
| 16 | ∞ | | 0.500 | | | |
| 17 | ∞ | | 0.500 | 1.51680 | 64.20 | |
| 18 | ∞ | | 0.800 | | | |

TABLE 4

EXAMPLE 2
ASPHERIC SURFACE DATA OF i-th SURFACE (*)

| | 2nd SURFACE | 6th SURFACE | 13th SURFACE |
|---|---|---|---|
| $\epsilon$ | 1.0000 | 1.0000 | 1.0000 |
| A4 | -0.41223923E-3 | -0.84276431E-3 | -0.31597479E-3 |
| A6 | -0.77261865E-4 | -0.26657178E-4 | 0.10345993E-6 |
| A8 | 0.56730025E-5 | -0.37958002E-5 | 0.31414158E-6 |
| A10 | -0.44555849E-6 | 0.54324697E-7 | -0.93589935E-8 |

TABLE 5

EXAMPLE 3
POSITION (W)~(M)~(T)
f[mm] 5.90~14.40~21.19
FNO 3.60~4.20~5.10

| i | ri[mm] | | di[mm] | Ni | vi | |
|---|---|---|---|---|---|---|
| 1 | 29.104 | | 0.800 | 1.84481 | 40.48 | L1 |
| 2 | 4.880 | * | 1.575 | | | Gr1(−) |
| 3 | 7.343 | | 1.332 | 1.79850 | 22.60 | L2 |
| 4 | 14.627 | | 14.119~1.310~1.261 | | | |
| 5 | ∞ | | 0.000 | | | ST |
| 6 | 4.858 | * | 2.356 | 1.85000 | 40.04 | L3 |
| 7 | −19.976 | | 0.710 | 1.74141 | 24.62 | L4 |
| 8 | 3.768 | | 0.831 | | | Gr2(+) |
| 9 | 12.575 | | 0.906 | 1.79370 | 38.06 | L5 |
| 10 | −36.776 | | 5.375~11.383~20.289 | | | |
| 11 | −8.456 | | 0.700 | 1.84805 | 28.68 | L6 |
| 12 | −21.855 | | 0.100 | | | Gr3(+) |
| 13 | 17.655 | * | 2.337 | 1.63546 | 56.77 | L7 |
| 14 | −8.748 | | 2.556~5.829~0.500 | | | |
| 15 | ∞ | | 0.500 | 1.54426 | 69.60 | PT |
| 16 | ∞ | | 0.500 | | | |
| 17 | ∞ | | 0.500 | 1.51680 | 64.20 | |
| 18 | ∞ | | 0.800 | | | |

TABLE 6

EXAMPLE 3
ASPHERIC SURFACE DATA OF i-th SURFACE (*)

| | 2nd SURFACE | 6th SURFACE | 13th SURFACE |
|---|---|---|---|
| ε | 1.0000 | 1.0000 | 1.0000 |
| A4 | −0.32254131E−3 | −0.41674035E−3 | −0.44981911E−3 |
| A6 | −0.56309851E−4 | −0.15929099E−4 | 0.58942905E−5 |
| A8 | 0.32891448E−5 | −0.63566809E−6 | −0.13834196E−6 |
| A10 | −0.15892769E−6 | −0.23607655E−7 | 0.19768636E−8 |

TABLE 7

EXAMPLE 4
POSITION (W)~(M)~(T)
f[mm] 5.90~11.80~16.89
FNO 3.60~4.20~5.10

| i | ri[mm] | | di[mm] | Ni | vi | |
|---|---|---|---|---|---|---|
| 1 | 20.585 | | 0.800 | 1.85000 | 40.04 | L1 |
| 2 | 4.273 | * | 1.336 | | | Gr1(−) |
| 3 | 6.053 | | 1.184 | 1.81197 | 22.94 | L2 |
| 4 | 11.035 | | 11.182~1.447~1.218 | | | |
| 5 | ∞ | | 0.000 | | | ST |
| 6 | 4.657 | * | 2.057 | 1.85000 | 40.04 | L3 |
| 7 | −6.909 | | 0.710 | 1.69494 | 26.86 | L4 |
| 8 | 3.529 | | 0.621 | | | Gr2(+) |
| 9 | 15.327 | | 0.751 | 1.78142 | 40.20 | L5 |
| 10 | −35.607 | | 5.761~7.991~16.082 | | | |
| 11 | −14.916 | | 0.700 | 1.79850 | 22.60 | L6 |
| 12 | −63.383 | | 0.100 | | | Gr3(+) |
| 13 | 13.874 | * | 1.738 | 1.73811 | 52.14 | L7 |
| 14 | −16.084 | | 0.856~4.259~0.500 | | | |
| 15 | −22.775 | | 0.700 | 1.71389 | 53.05 | L8 |
| 16 | −21.640 | | 0.200 | | | Gr4(+) |
| 17 | ∞ | | 0.500 | 1.54426 | 69.60 | PT |
| 18 | ∞ | | 0.500 | | | |
| 19 | ∞ | | 0.500 | 1.51680 | 64.20 | |
| 20 | ∞ | | 0.800 | | | |

TABLE 8

EXAMPLE 4
ASPHERIC SURFACE DATA OF i-th SURFACE (*)

| | 2nd SURFACE | 6th SURFACE | 13th SURFACE |
|---|---|---|---|
| ε | 1.0000 | 1.0000 | 1.0000 |
| A4 | −0.44563934E−3 | −0.80627399E−3 | −0.17363871E−3 |
| A6 | −0.74479702E−4 | −0.21139129E−4 | −0.13218326E−5 |
| A8 | 0.51195118E−5 | −0.40303591E−5 | 0.32770081E−6 |
| A10 | −0.39929835E−6 | 0.85711769E−7 | −0.90176967E−8 |

TABLE 9

| | CONDITION | EXAMPLE1 | EXAMPLE2 | EXAMPLE3 | EXAMPLE4 |
|---|---|---|---|---|---|
| (1). (1a) | T23w/fw | 0.968 | 0.916 | 0.911 | 0.977 |
| (2). (2a) | TLmax/(fw · ft)$^{0.5}$ | 3.007 | 2.905 | 3.220 | 3.106 |
| (3). (3a) | f3/f2 | 1.799 | 1.855 | 1.732 | 1.800 |
| (4). (4a) | ft/fw | 2.863 | 2.863 | 3.592 | 2.863 |
| (5). (5a) | β 3w/β 3t | 0.944 | 0.967 | 0.875 | 0.973 |
| | fw | 5.9 | 5.9 | 5.9 | 5.9 |
| | ft | 16.89 | 16.89 | 21.19 | 16.89 |
| | T23w | 5.71 | 5.403 | 5.375 | 5.762 |
| | TLmax | 30.02 | 29 | 36 | 31.007 |
| | f2 | 9.022 | 8.514 | 10.36 | 9.224 |
| | f3 | 16.235 | 15.793 | 17.944 | 16.599 |
| | β 3w | 0.8198 | 0.8532 | 0.8242 | 0.8078 |
| | β 3t | 0.8682 | 0.882 | 0.9416 | 0.8306 |

What is claimed is:

1. A variable magnification optical system for forming with variable magnification an optical image of an object onto a light acceptance surface of an image sensor, comprising in order from an object side:
a first lens group having negative optical power;
a second lens group having positive optical power; and
a third lens group having positive optical power, the third lens group including at least two lenses,
wherein
in magnification change from a wide-angle limit to a telephoto limit, the first lens group moves along a locus convex to an image side,
the second lens group moves monotonically to the object side, and
the third lens group moves along a locus convex to the object side.

2. A variable magnification optical system according to claim 1, wherein
the third lens group has a two-lens configuration, in order from the object side, consisting of a negative lens and a positive lens, while an air interval is provided between the two lenses.

3. A variable magnification optical system according to claim 2, wherein
in the third lens group, the negative lens has a meniscus shape convex to the image side, and
the positive lens has a shape convex to the image side.

4. A variable magnification optical system according to claim 2, wherein
in the third lens group, an air lens having positive optical power is formed in the air interval between the negative lens and the positive lens.

5. A variable magnification optical system according to claim 1, comprising an aspheric surface in the third lens group.

6. A variable magnification optical system according to claim 1, wherein the following condition is satisfied:

$$0.8 < T23w/fw < 1.7$$

where
$T23w$ is an on-the-axis air interval between the second lens group and the third lens group at the wide-angle limit, and
$fw$ is a focal length of the entire optical system at the wide-angle limit.

7. A variable magnification optical system according to claim 1, wherein the following condition is satisfied:
in the variable magnification range from the wide-angle limit to the telephoto limit, $$2.1 < TLmax/(fw \cdot ft)^{0.5} < 3.6$$

where
TLmax is the maximum value of an on-the-axis distance from the top of the most object side lens surface to the image surface,
fw is a focal length of the entire optical system at the wide-angle limit, and
ft is a focal length of the entire optical system at-the telephoto limit.

8. A variable magnification optical system according to claim 1, wherein the following condition is satisfied:

$$f3/f2 < 1.95$$

where
f2 is a focal length of the second lens group, and
f3 is a focal length of the third lens group.

9. A variable magnification optical system according to claim 1, wherein the variable magnification optical system is composed of three lens groups.

10. A variable magnification optical system according to claim 1, wherein
each of the first, second, and third lens groups includes at least one aspheric surface,
the first lens group has a two-lens configuration, in order from the object side, consisting of a negative lens and a positive lens, while an air interval is provided between the two lenses, and
the second lens group has a three-lens configuration, while two of these lenses form a cemented lens composed of a positive lens and a negative lens.

11. A variable magnification optical system according to claim 1, further comprising a fourth lens group having positive optical power, wherein the position of the fourth lens group is fixed at the time of magnification change.

12. A variable magnification optical system according to claim 1, wherein the following condition is satisfied:

$$0.9 < T23w/fw < 1.5$$

where
T23w is an on-the-axis air interval between the second lens group and the third lens group at the wide-angle limit, and
fw is a focal length of the entire optical system at the wide-angle limit.

13. A variable magnification optical system according to claim 1, wherein the following condition is satisfied:
in the variable magnification range from the wide-angle limit to the telephoto limit, $$2.5 < TLmax/(fw \cdot ft)^{0.5} < 3.5$$

where
TLmax is the maximum value of an on-the-axis distance from the top of the most object side lens surface to the image surface,
fw is a focal length of the entire optical system at the wide-angle limit, and
ft is a focal length of the entire optical system at the telephoto limit.

14. A variable magnification optical system according to claim 1, wherein the following condition is satisfied:

$$f3/f2 < 1.86$$

where
f2 is a focal length of the second lens group, and
f3 is a focal length of the third lens group.

15. A variable magnification optical system according to claim 1, wherein the following condition is satisfied:

$$2.1 < ft/fw < 4.3$$

where
fw is a focal length of the entire optical system at the wide-angle limit, and
ft is a focal length of the entire optical system at the telephoto limit.

16. A variable magnification optical system according to claim 1, wherein the following condition is satisfied:

$$2.4 < ft/fw < 4.0$$

where
fw is a focal length of the entire optical system at the wide-angle limit, and
ft is a focal length of the entire optical system at the telephoto limit.

17. A variable magnification optical system according to claim 1, wherein the following condition is satisfied:

$$0.8 < \beta 3w/\beta 3t < 1.0$$

where $\beta 3w$ is a lateral magnification of the third lens group at the wide-angle limit, and $\beta 3t$ is a lateral magnification of the third lens group at the telephoto limit.

18. A variable magnification optical system according to claim 1, wherein the following condition is satisfied:

$$0.85 < \beta 3w/\beta 3t < 0.98$$

where $\beta 3w$ is a lateral magnification of the third lens group at the wide-angle limit, and $\beta 3t$ is a lateral magnification of the third lens group at the telephoto limit.

19. An imaging device comprising:

an image sensor having a light acceptance surface; and a variable magnification optical system for forming with variable magnification an optical image of an object onto the light acceptance surface of the image sensor, having in order from the object side:

a first lens group having negative optical power;

a second lens group having positive optical power; and a third lens group having positive optical power, the third lens group including at least two lenses, wherein in magnification change from a wide-angle limit to a telephoto limit, the first lens group moves along a locus convex to the image side, the second lens group moves monotonically to the object side, and the third lens group moves along a locus convex to the object side.

* * * * *